US007823284B2

(12) United States Patent
Takahashi et al.

(10) Patent No.: US 7,823,284 B2
(45) Date of Patent: Nov. 2, 2010

(54) MASKING AN ENGINE BLOCK DURING COATING APPLICATION

(75) Inventors: Hideo Takahashi, Yokohama (JP); Takashi Ogino, Yokohama (JP); Kazuhiro Kougo, Yokohama (JP); Kiyokazu Sugiyama, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 1123 days.

(21) Appl. No.: 11/340,416

(22) Filed: Jan. 26, 2006

(65) Prior Publication Data

US 2006/0172066 A1 Aug. 3, 2006

(30) Foreign Application Priority Data

Jan. 28, 2005 (JP) ............................. 2005-021686
Dec. 1, 2005 (JP) ............................. 2005-348463

(51) Int. Cl.
*B23P 11/00* (2006.01)

(52) U.S. Cl. ............................. 29/888.061; 29/888.06; 29/458; 29/527.2; 118/306; 118/317; 118/504; 427/236; 427/421.1; 427/448

(58) Field of Classification Search ............. 29/888.01, 29/888.06, 888.061, 458, 527.2; 118/306, 118/317, 504; 427/236, 421.1, 448, 427.1
See application file for complete search history.

(56) References Cited

U.S. PATENT DOCUMENTS 4,857,367 A 8/1989 Thorn et al.
5,363,821 A * 11/1994 Rao et al. ................ 123/193.2
5,573,814 A * 11/1996 Donovan .................... 427/448
6,395,090 B1 * 5/2002 Shepley et al. .............. 118/504
6,719,847 B2 * 4/2004 Rice et al. ................... 118/504
7,555,837 B2 * 7/2009 Sugiyama et al. ...... 29/888.061
2002/0172769 A1 11/2002 Herber et al.

FOREIGN PATENT DOCUMENTS

EP 0 716 158 A1 6/1996
JP 6-065711 3/1994

OTHER PUBLICATIONS

Search Report for corresponding European Application No. 06 25 0428, dated Jun. 21, 2006, 4 pages.

* cited by examiner

*Primary Examiner*—David P Bryant
*Assistant Examiner*—Ryan J Walters
(74) *Attorney, Agent, or Firm*—Global IP Counselors, LLP

(57) ABSTRACT

Embodiments of the invention use a gas flow to prevent adherence of a coating to portions of an engine block adjacent to a cylinder bore being coated with the coating. Embodiments may be particularly useful for applying a coating on the inner surface of the cylinder bores in one cylinder bank while protecting cylinder bores in an opposing cylinder bank, e.g., in a V-type engine. One method of applying a coating to an engine block comprises spraying the coating on an inner surface of a first cylinder bore of the engine block. The method further comprises shielding a second cylinder bore of the engine block from the sprayed a coating with a gas flow while spraying the coating on the inner surface of the first cylinder bore.

6 Claims, 6 Drawing Sheets

MASKING AN ENGINE BLOCK DURING COATING APPLICATION

This application claims priority from Japanese Patent Application No. 2005-021686, filed Jan. 28, 2005, and Japanese Patent Application No. 2005-348463, filed Dec. 1, 2005, the entire contents each of being incorporated herein by reference.

TECHNICAL FIELD

The invention relates to techniques for coating a cylinder bore on an engine block.

BACKGROUND

An engine block may be designed to include a coating, e.g., a ferrous material, coated on the inner surface of the cylinder bore. Such a coating may allow engine designs having reduced overall weight of the engine block and enhanced abrasion resistant properties for inner surfaces of the cylinder bores. For example, a coating may be particularly useful for aluminum engine blocks.

It is desirable to prevent a coating from adhering to a lower portion of an adjacent cylinder bore. For example, if while spraying a coating on one cylinder bore, some amount of spray is directed to an adjacent cylinder bore, the spray in the adjacent cylinder bore will have a lower degree of adhesion. Thereafter, if the adjacent cylinder bore is coated, the coating in that cylinder bore will continue to have a low degree of adhesion to the cylinder bore. This may cause the coating in that cylinder bore to break free during engine operation, which may lead to poor engine performance or even engine failure.

One method to prevent a coating from adhering to a lower portion of the adjacent cylinder bore requires covering lower parts of the cylinder bore with a masking shield prior to spraying the cylinder bore with a coating. The masking shield protects the lower portion of the cylinder bore when the coating is formed on the inner surface of the engine cylinder bore. After spraying, the masking shield must be removed.

Removing masking shields is labor-intensive. Further, masking shields are consumable items that contribute to engine manufacturing expenses. In addition, since a coating may have formed a continuous layer connecting an inner surface of a cylinder bore to a masking shield, removal of a masking shield runs the risk of breaking and damaging the coating formed on the inner surface of the cylinder bore.

SUMMARY

Embodiments of the invention prevent or reduce adherence of a coating to a cylinder bore without using masking materials by protecting the lower portion of the cylinder bore with a gas gun. Embodiments of the invention may be particularly useful for forming a coating on the inner surface of the cylinder bores in one cylinder bank while protecting cylinder bores in an opposing cylinder bank, e.g., in a V-type engine.

In an embodiment, a method of applying a coating to an engine block comprises spraying the coating on an inner surface of a cylinder bore of a first cylinder bank of the engine block, and shielding a cylinder bore of a second cylinder bank of the engine block from the sprayed coating with a gas flow while spraying the coating on the inner surface.

In another embodiment, a system for applying a coating to an engine block comprises a coating gun that discharges a coating material to form the coating on an inner surface of a cylinder bore of a first cylinder bank of the engine block. The system further comprises a nozzle that discharges gas from within a cylinder bore of a second cylinder bank of the engine block to a crankcase side of the cylinder bore of the first cylinder bank and the cylinder bore of the second cylinder bank such that the cylinder bore of the second cylinder bank is shielded from the discharge of the coating material.

In an embodiment, a system comprises means for applying a coating to an inner surface of a cylinder bore of an engine block, and means for shielding a surface of the engine block with a gas flow to prevent the coating from adhering to the surface of the engine block.

In an embodiment, a nozzle comprises a housing sized to fit within a first cylinder bore in a first cylinder bank of an engine block, and an outlet to create a gas flow from within the first cylinder bore to a crankcase side of the engine block during application of a coating to an inner surface of a second cylinder bore in a second cylinder bank of the engine block.

Embodiments of the invention may provide one or more advantages. For example, since masking materials are reduced or not used, the process of removing the masking material from the engine block may be reduced or eliminated. This also helps to reduce manufacturing expenses by avoiding the use of consumable masking materials on which the spray material adheres. In addition, embodiments of the invention prevent damage to an applied a coating on the inner surface of the cylinder bore during removal of a masking material.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
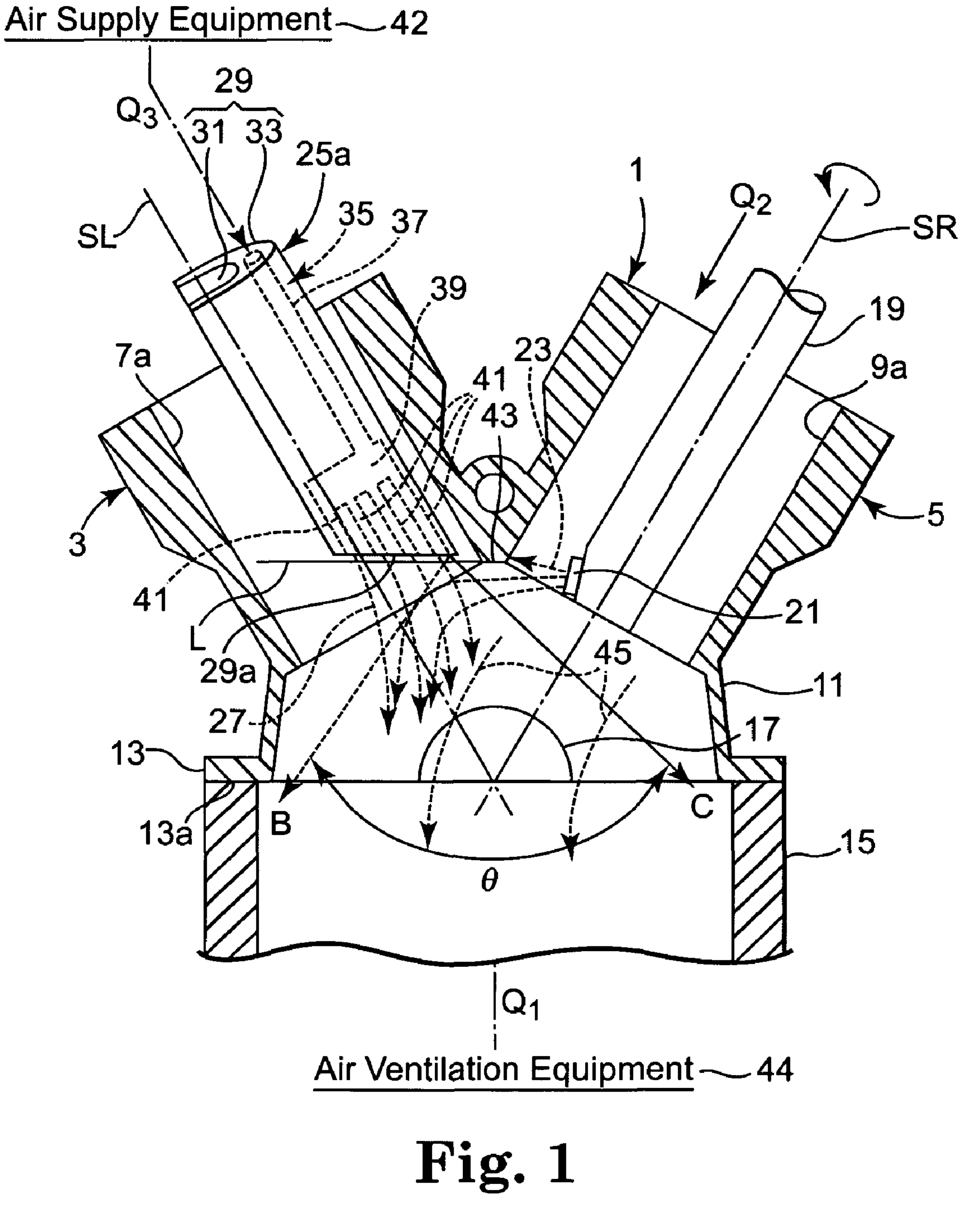
FIG. 1 is a cross-sectional view of A-A in FIG. 2 showing coating masking techniques in a first exemplary embodiment of the invention.
Figure 2:
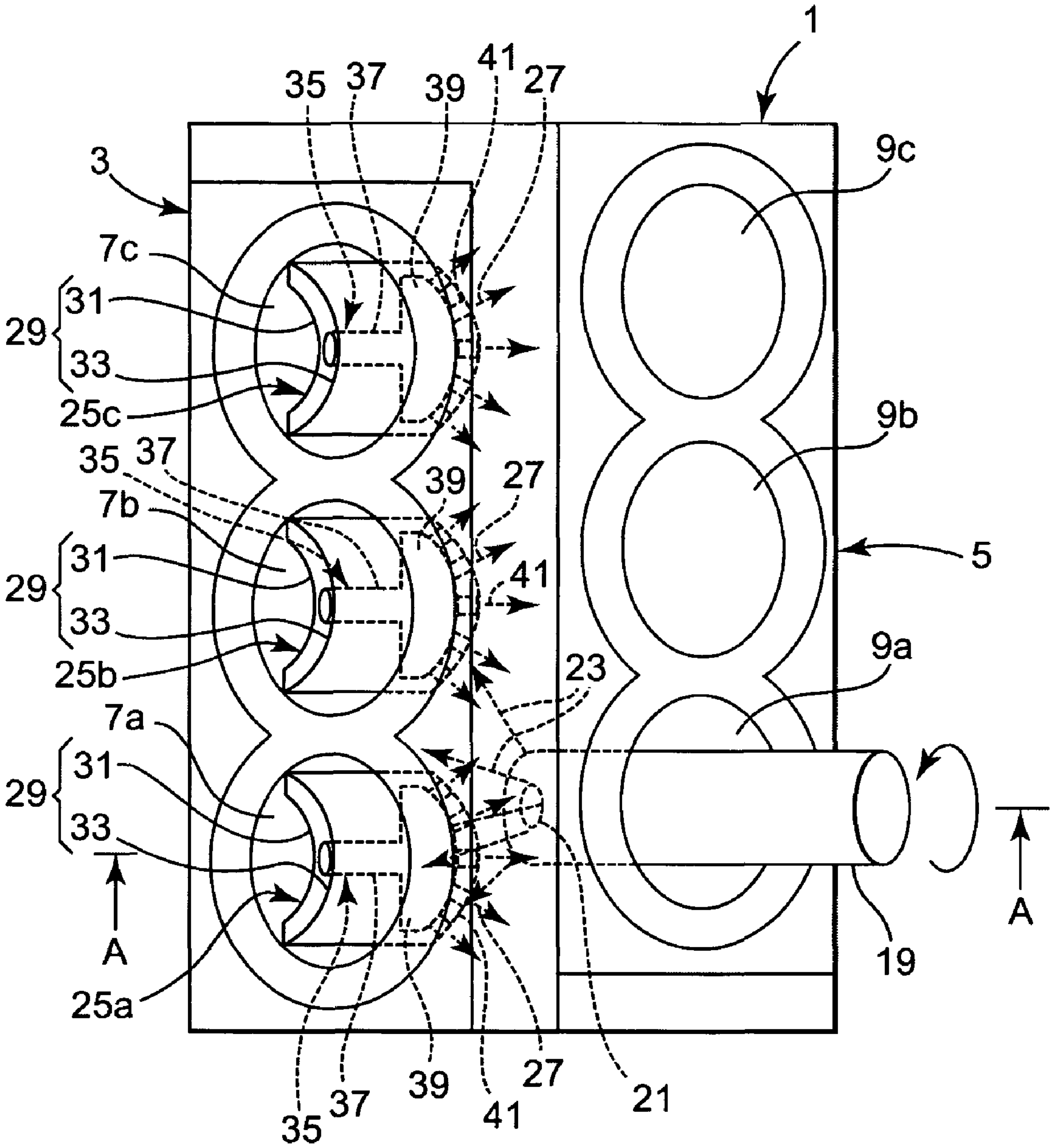
FIG. 2 is a plain view of the engine block 1 viewed from the side of the mounting surface in the first exemplary embodiment.

A first exemplary embodiment of coating masking techniques is shown in FIG. 1, which is a view of section A-A from FIG. 2. FIG. 2 is a side view of engine block 1 as viewed from the side of the mounting surface. In this example, the engine block 1 represents a V-type engine with the left and right banks 3 and 5, each bank having three cylinder bores, 7*a*, 7*b*, 7*c* and 9*a*, 9*b*, 9*c* respectively, arranged in straight lines toward the axial direction of the crankshaft (not shown).

The cylinder bores 7*a*, 7*b*, 7*c* form the cylinder bank on the left bank 3 and the cylinder bores 9*a*, 9*b*, 9*c* form the cylinder bank on the right bank 5 are arranged opposite to one another. Each of the cylinder bores 7*a*, 7*b*, 7*c* oppose each of the cylinder bores 9*a*, 9*b*, 9*c* and vice versa. The extensions of central axes SL of the cylinder bores 7*a*, 7*b*, 7*c* and SR of the cylinder bores 9*a*, 9*b*, 9*c* intersect with each other as viewed from the axial direction of the crankshaft, for example, the view shown in FIG. 1.

The engine block 1 may be designed to include a coating, e.g., a ferrous material, coated on the inner surface of the cylinder bore. For example, engine block 1 may be an aluminum engine block. Such a coating may enhance abrasion resistant properties for inner surfaces of the cylinder bores 7*a*, 7*b*, 7*c* and 9*a*, 9*b*, 9*c*.

The engine block 1, as shown in FIG. 1, includes crankcase 11 on the lower end of cylinder bores 7*a*, 7*b*, 7*c* and 9*a*, 9*b*, 9*c*. The oil pan rail 13*a* of flange 13, protruding to both sides of the crankcase 11, is fixed on the hollow center work stand 15. The crank journal 17 rotationally supports the crankshaft (not shown).

To create a coating, a coating gun 19, as shown in FIG. 2, enters the cylinder bore 9*a* in one cylinder bank on the right bank 5, and the center of the spray gun is aligned with the central axis SR of the cylinder bore 9*a*. The spray gun 19 rotates about the central axis SR as it moves along the central axis SR, spraying a coating material 23 from the spray nozzle 21. In this manner, a coating gun 19 forms a coating on the inner surface of the cylinder bore 9*a*.

Prior to spraying a coating, to protect lower portions of the cylinder bores 9*a*, 9*b* and 9*c*, gas guns 25*a*, 25*b*, 25*c* are inserted into the cylinder bores 7*a*, 7*b* and 7*c*, respectively, each opposite to the cylinder bores 9*a*, 9*b* and 9*c*. A gas 27 is then discharged out of the gas guns 25*a*, 25*b*, 25*c*. For example, the gas 27 may consist of air.

Gas guns 25*a*, 25*b*, and 25*c* are substantially similar; however, the following description will only refer to gas gun 25*a*, and cylinder bores 9*a* and 7*a*. The gas gun 25*a* is arranged as the semi-circular shaped gun housing 29, which is located along the lines of the inner surface of cylinder bore 7*a* at the near side of the cylinder bore 9*a*. The gun housing 29 has an inner portion 31 and an outer portion 33. The gas nozzle 35 is fixed in the space between inner portion 31 and outer portion 33.

The gas nozzle 35 forms gas path 37, which includes an expansion space 39 prior to multiple outlets 41. The multiple outlets 41 are arranged along the lines of the semi-circular gun housing 29. In other words, the outlets 41 of the gas nozzle 35 form a semi-circle along the inner portion 31 of the cylinder bore at the near side of the cylinder bore 9*a*. Gas 27 is supplied from the gas supply equipment 42 to gas path 37.

In addition, the gun housing 29 is longer near the wall of the cylinder bore and shorter near the center of the cylinder bore. Thus, the tip 29*a* is wedge shaped, which is aligned with the gas outlets of nozzle 41. Similarly, the length of the multiple outlets of nozzle 41 is the longest on the side of the cylinder bore 9*a*. The outlet length gradually gets shorter at positions farther from 9*a*, the nozzle located on the left end in FIG. 1 being the shortest.

A coating is formed all over the cylinder bore 9*a* inner surface by inserting a coating gun 19 into the cylinder bore 9*a* on the right bank 5, rotating while advancing it in the direction of the axis, and jetting a coating material 23 from a coating nozzle 21 on its tip. Simultaneously, the gas ventilation equipment 44 suctions out the gas in the engine block 1 from the lower side of the work stand 15 and pulls clean gas 45 in.

As the coating gun 19 forms the coating, the gas guns 25*a*, 25*b*, 25*c* are inserted into the cylinder bores 7*a*, 7*b*, 7*c* on the left bank 3 respectively, opposite to the cylinder bore 9*a*, and the gas supplied from the gas supply equipment 42 is sprayed as the gas 27 from the tip of each outlet 41.

In FIG. 1, the gas 27 that sprays from each outlet 41 of the gas guns 25*a*, 25*b*, 25*c* are arranged between the right and left flange parts 13 in the crankcase, and directed towards a range of angles θ between arrows B and C. In other words, the direction of the gas spray of each outlet 41 on the gas nozzle 35 is the opening part on the opposite side of the cylinder bore in the crankcase that communicates with the cylinder bore.

At this point, as shown in FIG. 1, a coating gun 19 is located at the terminal end of the cylinder bore 9*a*, and a coating nozzle 21 is directed towards the engine block bulkhead 43. As a result, some of a coating material 23 that sprays from a coating nozzle 21 flows towards the opposing cylinder bore 7*a* and comes very close to entering the cylinder bore 7*a*. However, the gas 27 that discharges from the gas gun 25*a* alters the direction of this flow downward, thereby preventing or reducing a coating material 23 from adhering to the inner surface of the opposing cylinder bore 7*a*. Likewise, the gas 27 spraying from the gas guns 25*b*, 25*c* prevents a coating material 23 from adhering to the cylinder bores 7*b*, 7*c* adjacent to the cylinder bore 7*a*.

As shown in FIG. 1, a coating material 23 the outlets of nozzle 41 are located near the opening on the side of the cylinder bore 7*a* where a coating material 23 may enter the cylinder bore 7*a* to prevent a coating from adhering to the cylinder bore 7*a*. In addition, the outlets 41 are located forming a semi-circular arc covering about half the inner surface of the cylinder bore 7*a* closest to the cylinder bore 9*a* that receives a coating. In particular the outlets of nozzle 41, are arranged in a half-circle such that each of the set of outlets is substantially equidistant from an interior surface the cylinder bore 7*b*. This arrangement enables the gas 27 that sprays from each outlet 41 to block the spray materials passing below the engine block bulkhead 43.

The gas gun 25*a* that is inserted into the cylinder bore 7*a* is located such that the tip 29*a* is behind line L. Line L is an extension of the straight line that connects the spray from nozzle 21 of a coating gun 19 to the end of the engine block bulkhead 43 between the cylinder bore 7*a* and 9*a*, which is on the upper side in FIG. 1. As such, gas gun 25*a* is substantially shielded from a coating material 23 by the engine block bulkhead 43. This prevents a coating material 23 from adhering to nozzle 41, which may prolong the use of the gas gun 25*a*. In contrast, if gas gun 25*a* projected beyond line L, some of a coating material 23 may adhere to the gas discharging mouth of the outlet 41 and reduce the functional life of gas gun 25*a*.

The direction of the gas discharging from each outlet is set such that the gas 27 and the ventilation gas 45 merge smoothly and flow downwards. Thus, the flow of the ventilation gas 45 is not disturbed much by gas 27, enabling the spraying process to be performed efficiently.

As described above, coating masking may be performed by discharging the gas from the same gas supply equipment 42 and inserting the gas guns 25A, 25*b* and 25*c* into cylinder bores 7*a*, 7*b* and 7*c* simultaneously. Thus, coating of cylinder bores 9*a*, 9*b* and 9*c* may be performed successively or simultaneously without allowing a coating to adhere to the cylinder bores 7*a*, 7*b* and 7*c* during the coating of any of cylinder bores 9*a*, 9*b* and 9*c*.

In some embodiments, when spraying the cylinder bore 9*a*, the gas 27 prevents a coating material 23 from adhering to the cylinder bore 7*b* and 7*c*. In such embodiments, the gas 27 may be sprayed only from the gas gun 25*a* rather than from each gas guns 25*a*, 25*b*, and 25*c* during the spraying of the cylinder bore 9*a*. When using the same gas supply source (gas supply equipment 42) for the gas guns 25*a*, 25*b*, 25*c*, a valve may installed in the middle of the gas piping (not shown) to direct gas only to gas gun 25*a*.

In addition, coating masking may be performed for each of three cylinder bores 9*a*, 9*b*, 9*c* consecutively, simultaneously or two at a time. In each case, the gas gun(s) 25*a*, 25*b* and 25*c* corresponding to the cylinder bore(s) 7*a*, 7*b* and 7*c* that are adjacent to each of the cylinder bores 9*a*, 9*b*, 9*c* being sprayed should be activated. In some embodiments, all gas gun(s) in cylinder bore(s) opposing a cylinder bore being sprayed may be activated.

When a coating is formed on the cylinder bore 9*a*, the gas 27 is supplied because of concern over the entrance of a coating material 23 due to the shape of the opening on the crankcase 11 of the cylinder bores 7*a*, 7*b*, 7*c* in the cylinder bank opposing the cylinder bore 9*a* that opposes the opening of the cylinder bore 9*a*. However, the cylinder bores 9*a*, 9*b*, 9*c* are parallel with one another and their openings on the crankcase 11 side are not opposed; therefore, there is no risk of entry of a coating material 23 into cylinder bores 9*b* or 9*c*.

After forming a coating on the cylinder bores 9*a*, 9*b* and 9*c* on the right bank 5, a coating gun 19 forms a coating on the cylinder bores 7*a*, 7*b* and 7*c*. This can be performed the same way as described above, by inserting the gas guns 25*a*, 25*b* and 25*c* into the cylinder bores 9*a*, 9*b* and 9*c* to discharge the gas. This time, a coating from a coating gun 19 is prevented from adhering to the cylinder bores 9*a*, 9*b* and 9*c*.

In the first exemplary embodiment described above, the ventilation gas amount Q1 suctioned by the gas ventilation equipment 44 is larger than the gas flow amount Q3 that the ventilation gas amount Q2 supplies to the gas gun 25*a*. This allows the assured draining of a coating material 23 flowing to the crankcase 1 side out of the engine block 1.

As described above, in the first exemplary embodiment, when a coating is formed on the cylinder bore 9*a*, a coating does not adhere to the cylinder bores 7*a*, 7*b*, 7*c* by the gas 27 flowing to the cylinder bores 7*a*, 7*b*, 7*c*. If a coating is formed to the cylinder bore 9*a* without taking such measures, a coating will adhere to the cylinder bores 7*a*, 7*b*, 7*c*.

In this case, compared with the cylinder bore 9*a* that actually performs a coating masking, the cylinder bores 7*a*, 7*b*, 7*c* are arranged further from a coating gun 19. The degree of adhesion of a coating attached to the cylinder bores 7*a*, 7*b*, and 7*c* is lower than that of a coating adhered to the cylinder bore 9*a*, which is problematic. Thereafter, a coating is formed by inserting a coating gun 19 to each of these cylinder bores 7*a*, 7*b*, 7*c* in the same way as the cylinder bore 9*a*. However, the low degree of adhesion of a coating remains for cylinder bores 7*a*, 7*b*, 7*c*, and a stable a coating can not be obtained.

In this case, although unwanted a coating can be taken off, the cylinder bore may, by design, have a rough surface from a shot peening process. Such a rough surface increases the degree of adhesion. As a result, it is difficult to completely remove undesirable coating.

Accordingly, as described in this embodiment, when a coating is formed on the cylinder bore 9*a*, it is possible to increase the degree of adhesion of a coating formed on the cylinder bores 7*a*, 7*b*, 7*c* later by preventing a coating from adhering to the cylinder bores 7*a*, 7*b*, 7*c* by flowing the gas 27 to the cylinder bores 7*a*, 7*b*, 7*c* in the opposing cylinder banks.

In addition, when a coating is formed on the cylinder bores 7*a*, 7*b*, 7*c* after forming a coating on the cylinder bores 9*a*, 9*b*, 9*c*, it can stabilize a coating and also facilitate the subsequent washing of the cylinder bores 9*a*, 9*b*, 9*c* by preventing a coating from adhering to the cylinder bores 9*a*, 9*b*, 9*c* on which a coating has been already formed by flowing gas to the side of the cylinder bores 9*a*, 9*b*, 9*c*.

Figure 3:
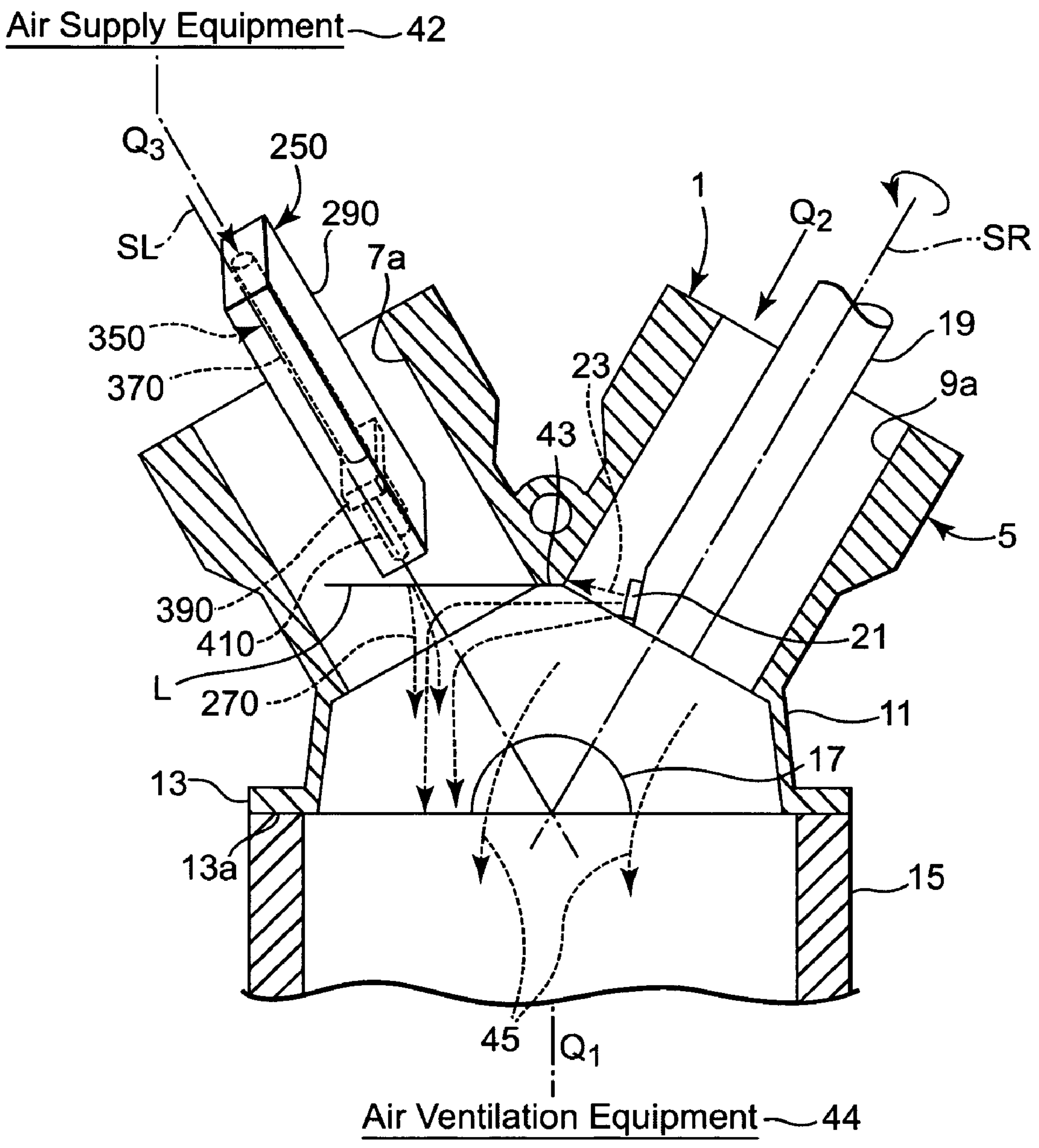
FIG. 3 is a cross-sectional view corresponding to FIG. 1 showing coating masking techniques in a second exemplary embodiment of the invention.

FIG. 3 is a cross-sectional view corresponding to FIG. 1 showing coating masking techniques in the second exemplary embodiment of the invention. In this embodiment a gas gun 250 is used instead of the gas gun 25*a*, 25*b* and 25*c* described in FIG. 1. Except for the gas gun 250, the structure and notations for members are the same as that in FIG. 1.

The gas gun 250 in the second exemplary embodiment has a gun housing 290 as a housing having a hollow rectangular shape. Inside the housing, the gas nozzle 350 is provided on the gas path 370 located on the side of rear anchor. The gas path 370 includes an expansion space 390 prior to outlets 410. Multiple outlets 410 on the side of rear anchor communicate with the expansion space 390.

As in the first exemplary embodiment, the direction of the gas spray of each outlet 410 on the gas nozzle 350 is inside the opening on the opposite side of the cylinder bore in the crankcase 11. The flow of the discharging gas 270 and that of the ventilation gas 45 merge smoothly and head downwards, the flow of the ventilation gas 45 is not greatly disturbed, and the spraying process may be performed efficiently.

In addition, as in the first exemplary embodiment, the tip of the gun housing 290, or the gas spray of each outlet 410 of the gas gun 250, is located on the side in the direction of gas discharging. Thus it is shown on the upper side in FIG. 3, located behind line L such that gas nozzle 350 is shield from a coating material 23 by the engine block bulkhead 43. Here again, a coating material 23 may be completely prevented from adhering to the gas spray of the nozzle 410. Consequently, equipment cost can be reduced by the prolonged use of the gas gun 250.

In this second exemplary embodiment, a coating gun 19 is located at the terminal end of the cylinder bore 9*a*, and outlet 21 is directed towards the engine block bulkhead 43. In this condition, a part of the spray material 23 from outlet 21 sprays towards the opposing cylinder bore 7*a* and comes close to entering it. However, the gas 270 that sprays from the gas gun 250 rectifies this flow downwards. As a result, a coating material 23 that sprays from outlet 21 is prevented from adhering to the inner surface of the opposing cylinder bores 7*a*, 7*b*, and 7*c*.

According to the second exemplary embodiment, since the gun housing 290 has a rectangular shape, the whole shape of the gas gun 250 is simplified as compared with the first exemplary embodiment.

In addition, as shown in FIG. 3, the multiple outlets 410 may be formed by slanting some outlets 410 toward the outside rather than forming all the outlets parallel to the central axis of the cylinder bore. This can be easily applied to various engine blocks with different diameters, rendering them versatile.

Figure 4:
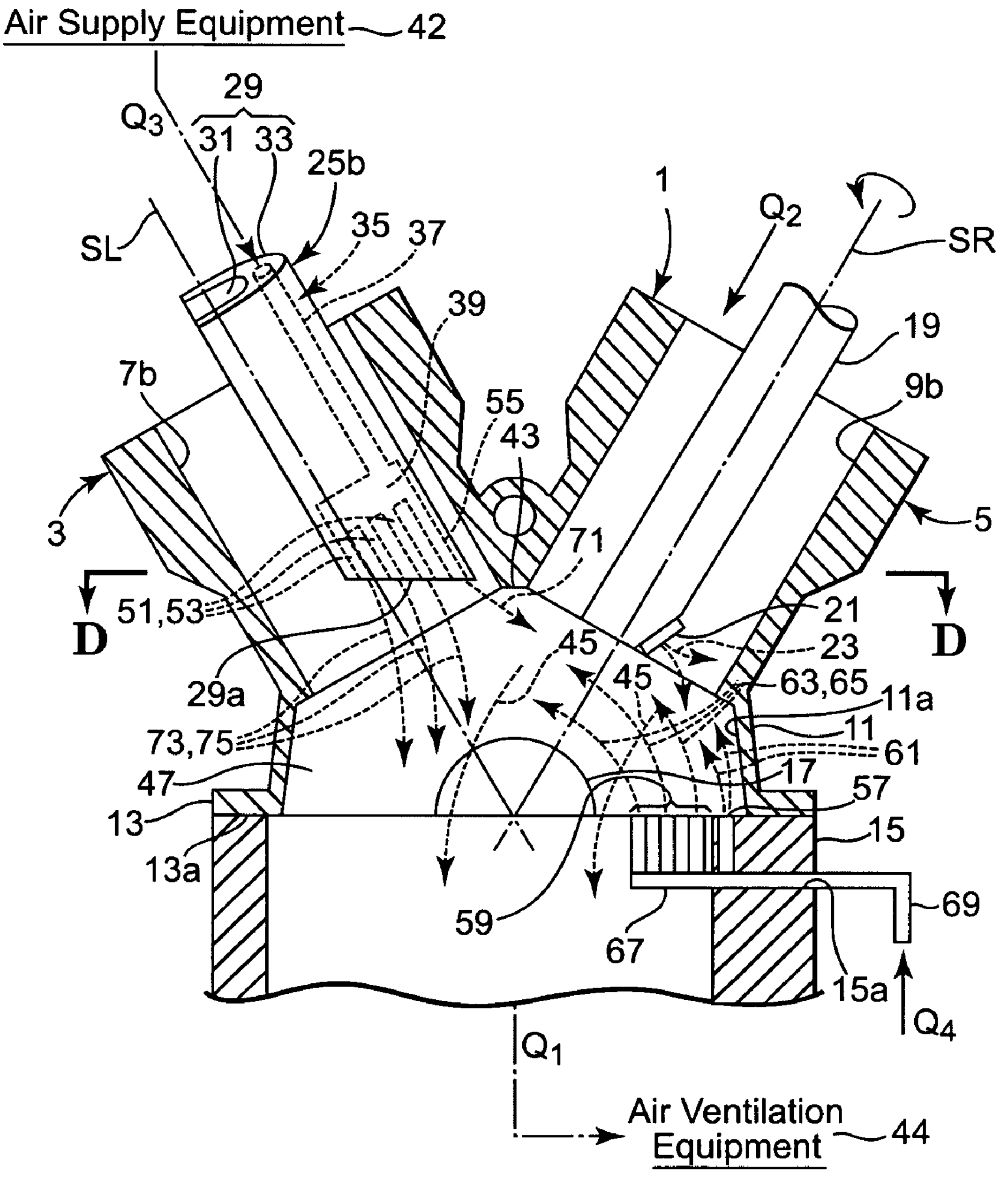
FIG. 4 is a cross-sectional view corresponding to FIG. 1 showing coating masking techniques in a third exemplary embodiment of the invention.
Figure 5:
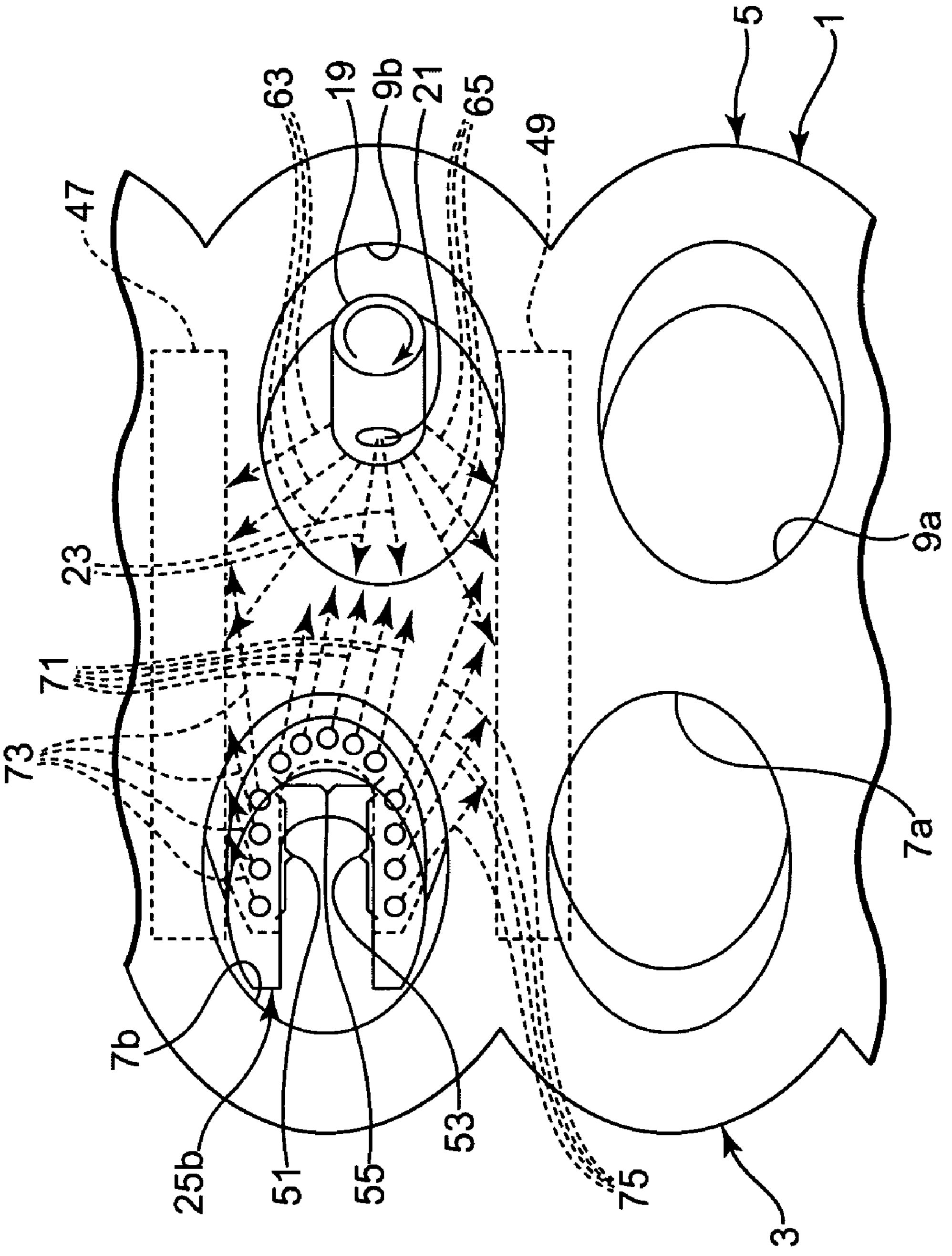
FIG. 5 is a cross-sectional view of D-D in FIG. 4.

FIG. 4 is a cross-sectional view corresponding to the FIG. 1, showing the coating masking method of the third exemplary embodiment. FIG. 5 is a cross-sectional view of D-D in FIG. 4. In FIG. 4 and FIG. 5, the same symbols are allocated to the same part or corresponding part of each component in FIG. 1 and FIG. 2. Also FIG. 4 and FIG. 5 show an example of forming a coating on the cylinder bore 9*b*, wherein the gas gun 25*b* is inserted into the cylinder bore 7*b* opposing the cylinder bore 9*b*.

The gas gun 25*b* in this embodiment has basically same structure as that shown in the FIG. 1. As shown in FIG. 5, it also include the crank journal wall oriented nozzles 51 and 53 that are directed to the crank journal walls 47 and 49 situated in the upper and the lower part in FIG. 5 respectively. Furthermore the third exemplary embodiment includes the cylinder bore oriented nozzle 55 directed to the cylinder bore 9*b*. The crank journal walls 47 and 49 comprise the crank journal 17 that rotationally supports the crankshaft (not shown).

The multiple crank journal oriented outlets of nozzles 51 and 53 (four outlets in this embodiment) are arranged along the horizontal direction in FIG. 5 respectively. These nozzles are oriented to the lower portion of the cylinder bore of the crank journal walls 47 and 49 where a coating can be easily adhered.

The multiple cylinder bore oriented outlets of nozzle 55 (five outlets in this embodiment) are arranged along the circular arc shape of gun housing 29 and are directed to the opening of crankcase 11 of the cylinder bore 9*b*. In particular, the outlets of nozzle 55 are arranged in a half-circle such that each of the set of outlets is substantially equidistant from an interior surface the cylinder bore 7*b*.

The outer gas nozzles 57 and 59 are arranged on the work stand 15 that is located downward of the cylinder bore 9*b* on which a coating is formed. These nozzles are gas discharging nozzles that spray gaseous gas upward in FIG. 4.

The outer gas nozzle 57 sprays the gas 61 toward the cylinder bore 9*b* along the inner wall 11 *a* of the crankcase 11. It is formed so as to open from within the wall of the work stand 15 to within the crankcase 11.

The multiple gas outlets of nozzle 59 (three outlets in this embodiment) are arranged inside of the work stand 15 along the horizontal direction in FIG. 4 and discharge the gas 63 and 65 toward the crank journal walls 47 and 49 shown in the FIG. 5. These multiple outer gas outlets of nozzle 59 are arranged on the pipes extending in the perpendicular direction, and the lower end of the nozzle is communicated with the pipe 67 extending to the horizontal direction.

The gas supply pipe 67 is connected to the continuous hole 15*a*, adjacent to the lower end of the outer gas nozzle 57. The outside of the continuous hole 15*a* also connects with the gas supply piping 69. The gas is supplied from a gas source (not shown).

The outer gas nozzle 59 may be oriented to focus gas on both of the crank journal walls 47 and 49 simultaneously. In other embodiments, outer gas nozzle 59 may focus gas on only crank journal walls 49, and a different outer gas nozzle may focus gas on crank journal walls 47.

In the third exemplary embodiment, the gas 71 discharging from the cylinder bore oriented nozzle 55 prevents a coating material 23 from flowing to the opposing cylinder bore 7*b* and entering the cylinder bore 7*b* by altering the direction. Consequently, it can prevent some of a coating material 23 discharged from a coating nozzle 21 from adhering to the inner surface of the opposing cylinder bore 7*b* and 7*a*, 7*c*.

In addition, the gas 73 and 75 discharging from the crank journal wall oriented nozzles 51 and 53 flow to the crank journal walls 47 and 49 respectively. This prevents a coating material 23 from adhering to the crank journal walls 47 and 49.

Moreover, similarly to the previously described gas 73 and 75, the gas 63 and 65 discharging from the outer gas nozzle 59 flow to the crank journal walls 47 and 49 respectively. This prevents a coating material 23 from adhering to the crank journal walls 47 and 49.

Also, the gas 61 discharging from the outer gas nozzle 57 flows along the inner wall 11*a* of the crankcase 11. This prevents a coating material 23 from adhering to the inner wall 11*a* of the crankcase 11.

The speed and amount of the gas 61, 63, 65 discharging from the outer gas nozzles 57 and 59 are set such that a coating material 23 draining into the crankcase 11 does not flow back to the cylinder bore 9*b*.

In the third exemplary embodiment shown in FIG. 4, the ventilation gas amount Q1 is determined so that the gas amount Q2 entering the cylinder bore 9*b* exceeds the total gas amount Q3 supplied to the gas gun 25*a* and the gas amount Q4 supplied to the gas supply piping 69. This ensures a coating material 23 flowing out to the crankcase 11 is directed out of the engine block 1.

Since the outer gas nozzles 57 and 59 are arranged on the work stand 15 where the engine block 1 is installed, the gas 61, 63, and 65 can be discharged accurately to the inner surface 11*a* of the crankcase 11 and the crank journal wall 47 without adjusting the position of the outer gas nozzle 57 and 59, by installing the engine block 1 in the specified position on the work stand 15.

While the third exemplary embodiment includes the gas 61, 63, and 65 sprayed on the inner wall 11*a* of the crankcase 11 and the crank journal walls 47 and 49 to prevent adhesion of the coating, it is not always necessary to prevent adhesion of the coating on inner wall 11*a* of the crankcase 11 and the crank journal walls 47 and 49. For example, even if some of a coating material 23 adheres to the inner wall 11*a* of the crankcase 11 and the crank journal walls 47 and 49, the degree of adhesion of a coating to the inner wall 11*a* of the crankcase 11 and the crank journal walls 47 and 49 is lower than that to the cylinder bore 9*a*. The distance between a coating gun 19 and the inner wall 11*a* of the crankcase 11 and the crank journal walls 47, 49 is greater than that between a coating gun 19 and the cylinder bore 9*a*. Furthermore, inner wall 11*a* of the crankcase 11 and the crank journal walls 47, 49 are not generally textured. Also, the inner wall 11*a* of the crankcase 11 and the crank journal walls 47, 49 are not processed after cast molding as cylinder bores, and an oxide film remains, resulting in an even lower level of adhesion. For all of these reasons, a coating adhering to the inner surface 11*a* of the crankcase 11 and the crank journal walls 47, 49 can be removed, e.g., by subsequent washing.

Figure 6:
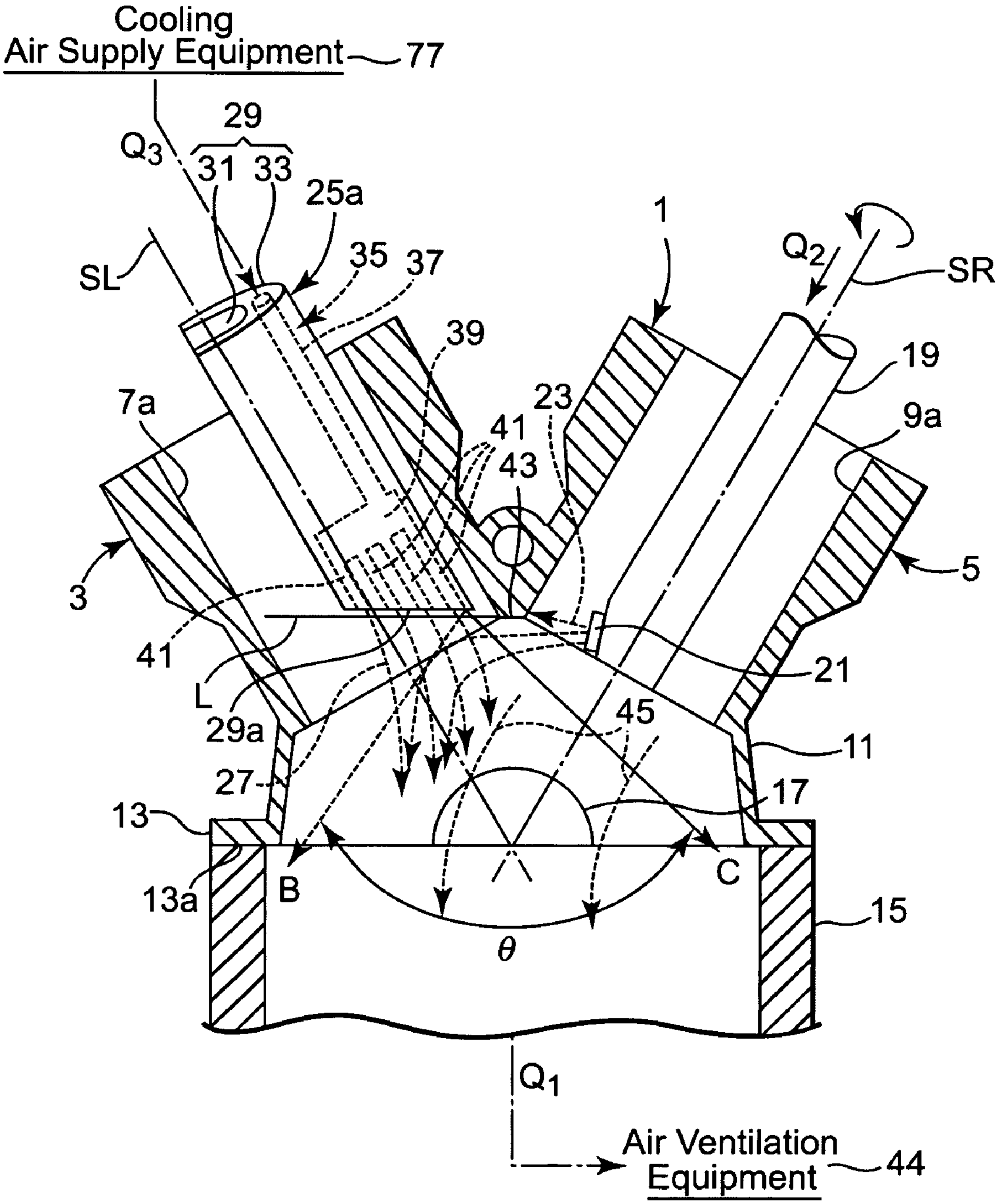
FIG. 6 is a cross-sectional view similar to FIG. 1, showing coating masking techniques in a fourth exemplary embodiment of the invention.

FIG. 6 is a cross-sectional view, showing the coating masking method of the engine block in the fourth exemplary embodiment of the invention. In FIG. 6, the same symbols are allocated to the same part or corresponding part of each component in FIG. 1.

The gas gun 25*a* in this embodiment has basically same structure as that shown in the FIG. 1; however, the supply source that supplies gas to the gas gun 25*a* is cooling gas supply equipment 77 instead of the gas supply equipment 42 in FIG. 1, and the entire gas gun 25*a* or a portion thereof is insulated to reduce or prevent condensation.

As compared to previously described embodiments, the cooling gas supplied from the cooling gas supply equipment 77 further decreases the adhesion of a coating material 23 to the cylinder bore 7*a*, the crank journal walls 47 and 49, and the inner surface 11*a* of the crankcase 11.

Since the degree of adhesion of a coating decreases at low temperature, a coating adhering in this condition can be more easily removed by subsequent washing. For example, a coating temporally adhering to the cylinder bore 7*a* and the crank journal walls 47, 49 or the inner wall 11*a* of the crankcase 11 can be removed.

However, the cooling gas into the gas gun 25*a* may result in condensation and water drops. When water drops appear, these water drops flow out to the crankcase 11 side and this has adverse effects in forming a coating on the cylinder bore 9*a* due to the steam generated within the engine block 1. However, it is possible to prevent condensation on the outer wall surface of the gas gun 25*a* by insulating the entire gas gun 25*a*, including the gas nozzle 35 or a portion thereof.

Cooled gas may be used in conjunction with any of the described embodiments. For example, the gas 61, 63, 65 discharged from the outer gas nozzles 57, 59 may be substituted with cooling gas. In addition, the entire outer gas nozzles 57, 59 or a portion thereof may be insulated.

Various embodiments of the invention have been described. However, various modifications can be made within the spirit of the invention. For example, in each of the above described embodiments, a V-type engine was described. The invention can be applied to any engines and is particularly applicable to any arrangement including opposing cylinders. For example, an engine may include additional cylinder banks or other arrangement of cylinders. In such cases, opposing cylinders may be masked using the described techniques to prevent undesirable adhesion of the coating. Furthermore, the described embodiments may be readily adapted to mask additional portions of an engine block. In addition, in each of the above described embodiments, the operation of a coating gun 19 and the gas guns 25*a*, 25*b*, 25*c*, and 250 may automated with a robotic mechanism, by manual operation of workers or a combination thereof. These and other embodiments are within the scope of the following claims.

The invention claimed is:

1. A method of applying a coating to an engine block comprising:

spraying the coating on an inner surface of a cylinder bore of a first cylinder bank of the engine block;

shielding a cylinder bore of a second cylinder bank of the engine block from the sprayed coating with a first gas flow while spraying the coating on the inner surface; and shielding an inner wall of a crankcase from the sprayed coating with a second gas flow while spraying the coating on the inner surface, the first gas flow being sprayed toward the sprayed coating, with the first gas flow directly altering a direction of the sprayed coating by the first gas flow directly contacting the coating.

2. The method of claim 1, wherein the cylinder bore of the first cylinder bank opposes the cylinder bore of the second cylinder bank.

3. The method of claim 2, wherein the cylinder bore of the first cylinder bank defines a first central axis line and the cylinder bore of the second cylinder bank defines a second central axis line, wherein the first central axis line intersects the second central axis line, wherein the spraying is accomplished using a coating gun having a coating nozzle, and wherein the coating nozzle is positioned within the cylinder bore of the first cylinder bank near an end of the cylinder bore of the first cylinder bank that is closest to the intersection of the first central axis line and the second central axis line.

4. The method of claim 1, wherein the first gas flow is directed to a crankcase side of the cylinder bore of the first cylinder bank and a crankcase side of the cylinder bore of the second cylinder bank.

5. The method of claim 1, wherein the first gas flow is directed from a first nozzle of a gas gun.

6. The method of claim 5, wherein the second gas flow is directed from a second nozzle during the spraying of the coating on the inner surface.

* * * * *